US00RE36075E

United States Patent [19]

Jonic

[11] E Patent Number: Re. 36,075

[45] Reissued Date of Patent: Feb. 2, 1999

[54] MOTOR VEHICLE ANTI-THEFT SECURITY SYSTEM

[76] Inventor: Danko Jonic, 9514 W. Lawrence Ct. #2F, Schiller Park, Ill. 60176

[21] Appl. No.: 810,052

[22] Filed: Mar. 4, 1997

Related U.S. Patent Documents

Reissue of:

[64] Patent No.: 5,506,563
Issued: Apr. 9, 1996
Appl. No.: 226,354
Filed: Apr. 12, 1994

[51] Int. Cl.[6] ..... B60R 25/00

[52] U.S. Cl. ..... 340/426; 455/345; 455/346; 307/10.2; 307/10.3; 180/287; 180/289

[58] Field of Search ..... 340/426; 455/345, 455/346, 99; 307/10.1, 10.2, 10.3, 10.7, 10.5, 10.6; 180/287, 289

[56] References Cited

U.S. PATENT DOCUMENTS

| | | | |
|---|---|---|---|
| 3,004,170 | 10/1961 | Greenspan | 307/10 |
| 3,525,414 | 8/1970 | Copelan | 180/114 |
| 3,581,259 | 5/1971 | Brunside | 336/90 |
| 3,756,341 | 9/1973 | Tonkovich et al. | 180/114 |
| 3,942,605 | 3/1976 | Burnside | 180/114 |
| 4,638,293 | 1/1987 | Min | 340/426 |
| 4,679,026 | 7/1987 | Knakowski et al. | 340/63 |
| 4,726,789 | 2/1988 | Yaffe | 439/567 |
| 4,745,897 | 5/1988 | Tejeda | 123/198 |
| 4,758,817 | 7/1988 | Akiyama | 340/63 |
| 4,803,460 | 2/1989 | Rhee | 340/63 |
| 4,805,722 | 2/1989 | Keating et al. | 307/10.5 |
| 4,866,416 | 9/1989 | Holzhauer et al. | 340/426 |
| 4,906,969 | 3/1990 | Ghazarian | 340/426 |
| 4,945,872 | 8/1990 | Embry | 123/146.5 B |
| 5,107,244 | 4/1992 | Minamide et al. | 340/426 |
| 5,304,979 | 4/1994 | Lime et al. | 340/426 |
| 5,554,966 | 9/1996 | Iijima et al. | 340/426 |
| 5,705,776 | 1/1998 | Howard | 340/426 |

OTHER PUBLICATIONS

Pioneer Electronics Model No. KE–450 QR, schematic diagram.

"Removable Radio Case" advertisement , Warshawsky/Whitney Metro Catalog No. 119 J at p. 49.

*Primary Examiner*—Edward Lefkowitz

*Attorney, Agent, or Firm*—Marshall, O'Toole, Gerstein, Murray & Borun

[57] ABSTRACT

An anti-theft system is described adaptable to any motor vehicle have a removable accessory electronic unit such as a high-fidelity stereo component unit installed within a mounting bracket and slidably detachable therefrom. Upon leaving the car, the vehicle owner takes along the entire accessory unit, or alternatively takes only a detachable front control panel from the unit, for secure safekeeping or to be retained in the personal possession of the owner. At the same time, continuity of the electrical circuit supplying current from the storage battery to the motor vehicle fuel pump (or ignition switch, or other control component of the vehicle) is interrupted, thus preventing normal operation of the vehicle and protecting against unauthorized use.

5 Claims, 2 Drawing Sheets

MOTOR VEHICLE ANTI-THEFT SECURITY SYSTEM

Matter enclosed in heavy brackets [ ] appears in the original patent but forms no part of this reissue specification; matter printed in italics indicates the additions made by reissue.

FIELD OF THE INVENTION

The present invention relates to the field of anti-theft devices for motor vehicles, in particular motor vehicles that have an electronic accessory unit such as a high-fidelity car stereo removable from a mounting bracket which is secured to the dashboard, to the front bulkhead or to the floor area of the passenger compartment within the motor vehicle.

BACKGROUND AND SUMMARY OF THE INVENTION

A wide variety of automobile anti-theft devices are known in the art. As the public demand for approaches to improved security has increased, especially within recent years, the number of these devices has grown proportionately. However, despite the momentum of accelerating technological innovation, such anti-theft systems have not been widely accepted by the public. Being perhaps somewhat complicated in operation or else unmanageable or unwieldy as a practical matter, oftentimes devices for improving automobile security have not been effectively used on an everyday basis by vehicle owners. To be sure, no anti-theft system can be considered indefatigable. All the same, a secure protective system that could be made widely available and one that could be properly and effectively implemented without undue effort, difficulty or inconvenience for the vehicle owner, might serve to provide a positive contribution towards decreasing the prevalence of car theft generally.

An area of particular focus and significance in the field of automotive anti-theft devices concerns the security and protection of car stereo system component units, which oftentimes have a radio receiver and amplifier along with a tape cassette or compact disc player combined in a single unit. The amount of interest directed to this field is readily understandable since, among these who are concerned with high-fidelity audio and who desire having a quality sound system installed inside their cars, ensuring their audio system components against tampering and theft is also an important consideration.

The security problem for car stereos becomes all the more acute, of course, with modern-day high-fidelity systems which, being both expensive and rather easily portable, all too readily may become targets for attracting unwanted attention. Unfortunately, even the best high-fidelity car stereos remain susceptible to the extent that destruction and disassembly of their installations, however strongly bolted or riveted they may have been initially, might be quickly accomplished using relatively simple tools which are commonly available and not subject to interdiction.

As one of the preferred solutions for preventing the theft of car stereos, vehicle owners often request to have these units installed within a protective sleeve or a mounting bracket contained inside the front dashboard. The entire unit can then be simply removed from the bracket, and thus guarded for safe keeping in the personal possession of the owner, or secured for storage away from the visible notice of any casual passerby whenever the car is to be parked along a public thoroughfare or left unattended for some extended period of time. More recently, some of these units have been manufactured with a separately detachable control panel that can be removed from the front surface of the component unit. By detaching the control panel, the owner renders the accessory component unit virtually unusable and inoperable even while the rest of the unit remains in place unremoved within the dashboard.

Numerous other approaches exist intending to protect against the misappropriation of car stereos, including such various devices as a warning alarm which sounds upon attempted tampering, or a remainder alarm prompting the vehicle owner to remove the unit before leaving the car. The latter type of apparatus is exemplified in Ghazarian (U.S. Pat. No. 4,906,969) disclosing an anti-theft warning system in which a flashing LED light or an audible beeper alarm becomes activated whenever a removable accessory unit is installed in place within the car during the time until the ignition switch is also closed. The warning system in fact requires the motor vehicle owner to remove the accessory unit before leaving the vehicle, in order to deactivate the warning alarm. There are also my prior art systems of the former type, for example the anti-theft device for a removable car stereo unit disclosed by Holzhauer et. al. (U.S. Pat. No. 4,866,416). The Holzhauer system is intended to inactivate the car stereo by means of a small change-over switch that responds to either a control signal from a separate, "pre-armed" burglar alarm system contained somewhere within the motor vehicle, or alternatively to slight deformation of the outer edge of the microswitch due to small amounts of physical pressure such as would occur if the car stereo were improperly removed. There are a large number of other car stereo anti-theft systems having mechanically activated switching means, as for example shown in the disclosure of Knakowski et al. (U.S. Pat. No 4,679,026). These several devices are all intended as precautions taken to prevent the attempted larceny of perhaps the most vulnerable automotive accessory. Yet, they are nonetheless all inherently limited, having no amount of effectiveness as regards protective security for the enirety of the motor vehicle.

The prior art also includes a number of anti-theft devices specifically for the prevention or deterrence of theft for the motor vehicle only. Some of these involve a mechanically or electrically coded key required in addition to the automobile ignition key for the normal starting or operation of the vehicle. Again, there are a wide variety of these, with a wide array of mechanical and electrical combinations, for example the variably configurable device disclosed by Greenspan (U.S. Pat. No. 3,004,170). However, among all these numerous anti-theft systems, none as yet has the advantages that might be obtained, in terms of overall usefulness and convenience of implementation, by combining integrally within a removable electronic accessory component unit such as a car stereo, a protective system having anti-theft deterrence for the entire motor vehicle.

Accordingly, it is the primary object of the present invention to provide a more comprehensive and at the same time more conveniently practicable mode of anti-theft protection for the automobile owner who may already have a theft-preventing removable car stereo, but who lacks a similarly effective anti-theft security system to ensure protection of the entire vehicle. By adapting a particular set of anti-theft elements from the electrical system of the vehicle, and incorporating these within the integral components of an anti-theft removable electronic accessory unit, the present invention permits a measure of protection for an entire car similar to that which previously could be obtained only for the accessory unit itself. Furthermore, the present invention provide the motor vehicle owner a means for achieving anti-theft protection which might be less cumbersome or tedious to use on an everyday basis. The very simplicity and accessibility of its implementation adds to the likelihood of a protective anti-theft system having a positive effect.

Another object of the present invention is to frustrate or deter tampering by those attempting to "jump-wire" the car, trying to defeat or to bypass the negative control of the vehicle that ordinarily obtains upon removal of the accessory unit. The connector used for attaching the removable component has a plurality of electrical contact points, of which only one particular pairing might be used to establish the requisite electrical continuity necessary to operate the motor vehicle. Connector contacts the are not actively required in the electronic system of the vehicle are connected to electrical ground. An intruder who tries to "jump-wire" the car may inadvertently cause a short-circuit to occur in the electrical wire leading from the motor vehicle storage battery; this opens a protective circuit-breaking fuse, interposed between the connector unit and the motor vehicle storage battery, thus interrupting the supply of electrical power for the automobile fuse pump, thereby disabling normal operation of the motor vehicle.

The precise configuration of the invention might be altered according to the varying circumstances, and the particular preferences of individual motor vehicle owners, and is therefore adaptable across a wide variety of specific embodiments. However, the general outlines of the invention as demonstrated and disclosed herein may be shown definitively by reference to the accompanying drawings and to the detailed description following.

DETAILED DESCRIPTION OF THE INVENTION

Figures 1, 2:
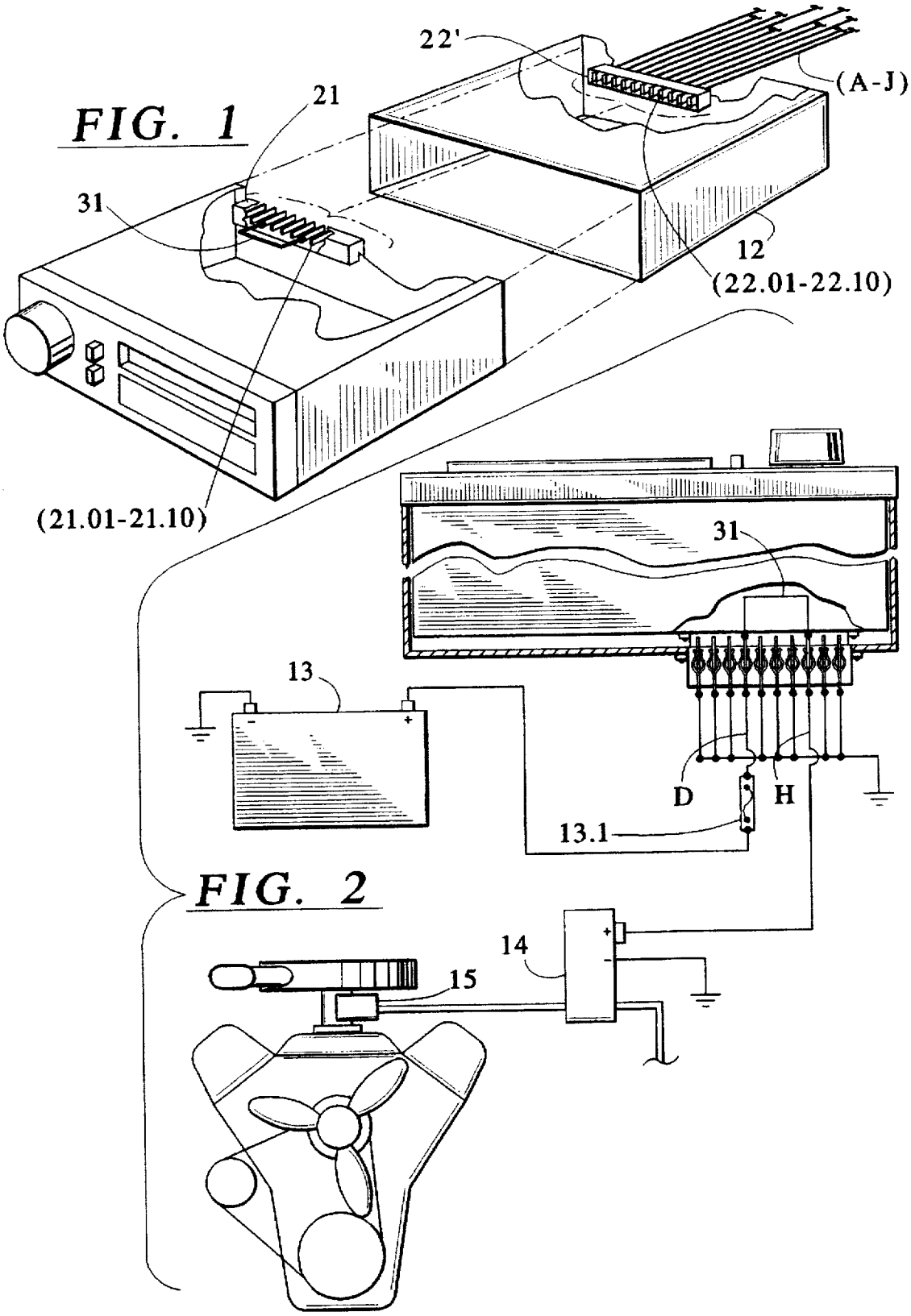
FIG. 1 is an exploded perspective view depicting an exemplary embodiment of the present invention, wherein a removable car stereo unit is shown in juxtaposition to a non-removable mounting bracket along with a component connector joining between them, and with wires leading away from the connector apparatus and going to other parts of the automotive electrical system.
FIG. 2 is a combined illustration and circuit schematic of the arrangement shown in FIG. 1, depicting the car stereo and mounting bracket in close apposition, with the two parts of the connector unit conjoined, and with a schematic representation of the wires leading away from the connector assembly, towards the motor vehicle storage battery and fuel pump.

Referring first to FIG. 1, wherein the present invention is shown as adapted for use with an electronic automotive accessory of the type that is removable as an entire component unit. In the illustrated embodiment, a typical car stereo component unit (11) is located in proximal alignment and adjacent to a mounting bracket (12) into which the car stereo unit can be slidably inserted. The backplane of the removable unit, as depicted in the cutaway perspective of FIG. 1, includes an insertable portion of the connector assembly (21) which bas a number of insertion elements arranged in a single horizontal row of vertically panel metal plates (21.01 thru 21.10). When the removable car stereo component is slidably inserted into the mounting bracket, each of the metal insertion plates connects to one of the knife-catch receptacle elements (22.01 thru 22.10) shown attached to the interior surface of the backplane side of the mounting bracket. Each of the knife-catch receptacle elements contains a single pair of metal lugs which are spring biased and interleaved so as to hold between then in secure electrical contact one of the metal insertion plates. The several receptacle elements are arranged in a single horizontal row to align conformably with the vertical plates of the insertion element. When the removable car stereo including the entire chassis box is fully inserted into the mounting bracket, each one of the flat vertical insertion plates connects within and is contained between a corresponding pair of metal lugs within one of the receptacle elements, the entire horizontally disposed array of knife-catch receptacle elements defining the socket portion of the connector assembly (22).

The wires (a thru j) leading away from the backplane of the mounting bracket represent only a portion of all the electrical wires that may needed for proper function of the car stereo. For example, the car stereo may require antenna input leads, or other auxiliary source input leads; additionally the car stereo may require a number of outputs leading to audio amplifiers or speakers. Ordinarily, a removable car stereo unit may have twenty or more wire leads, each of them having a separate but necessary function for the car stereo sound system. The present invention considers that the wiring shown in the illustrations are therefore only a subset of all the electrical wires that a car stereo unit may have, and the schematics shown are thus only partially complete in that sense. A representative schematic of the sort of wiring configuration that is needed for the present invention is detailed in FIG. 2 which is a top-down view of the connector assembly (22) depicted along with other parts of the anti-theft device of the present invention, shown in a diagrammatic form.

Of the several wires (a–j) depicted in FIG. 2, attention is drawn in particular to wire (d) and wire (h), and to the wiring bridge (31) that runs between them and that is contained within the insertable portion of the connector assembly (21). The wiring bridge is the link that establishes electrical continuity between wire (d) and wire (h) whenever the two parts of the connector assembly are brought together, which is to say whenever the car radio is fully inserted into the mounting bracket so that the insertable portion and the receptacle portion of the connector assembly are mechanically and electrically conjoined. Without the link of continuity between wire (d) and (h) which the connecting bridge (31) allows, there is an opening in the electrical circuit bringing electrical power from the storage battery (13) to the fuel pump (14). Therefore, whenever the car stereo is removed from the mounting bracket, the bridging link is interrupted, and the fuel pump no longer operates to fuel to engine thru the carburetor (15), preventing the motor vehicle thereby from being operated in a normal fashion.

The present invention also contains another feature which is additionally shown within the schematic diagram of FIG.

2, and specifically by the fuse interposed between the storage battery (13) and wire (d), and by the grounding of the several remaining wires that are not otherwise assigned to a particular function required either for the operation of the car stereo or for operation of the motor vehicle. In the schematic shown, all the wires excepting (d) and (h) are redundant in this manner, and are thus contemplated by the present invention to comprise elements of an anti-tampering system. Any would-be intruder attempting to "jump-wire" the system in order to bypass the anti-theft protection offered by the electronic bridge circuit would be at risk of inadvertently creating instead a jump-wire shunt that would connect the power supply (d) directly to chassis ground thru any one of the remaining wires not otherwise in use. The short-circuit that would then occur would overload the circuit-breaking fuse (13.1) causing the motor vehicle immediately to cease normal operation, in a manner comparable to the electrical disjunction and disconnect that occurs when the car stereo is removed from the motor vehicle.

Figures 3, 4:
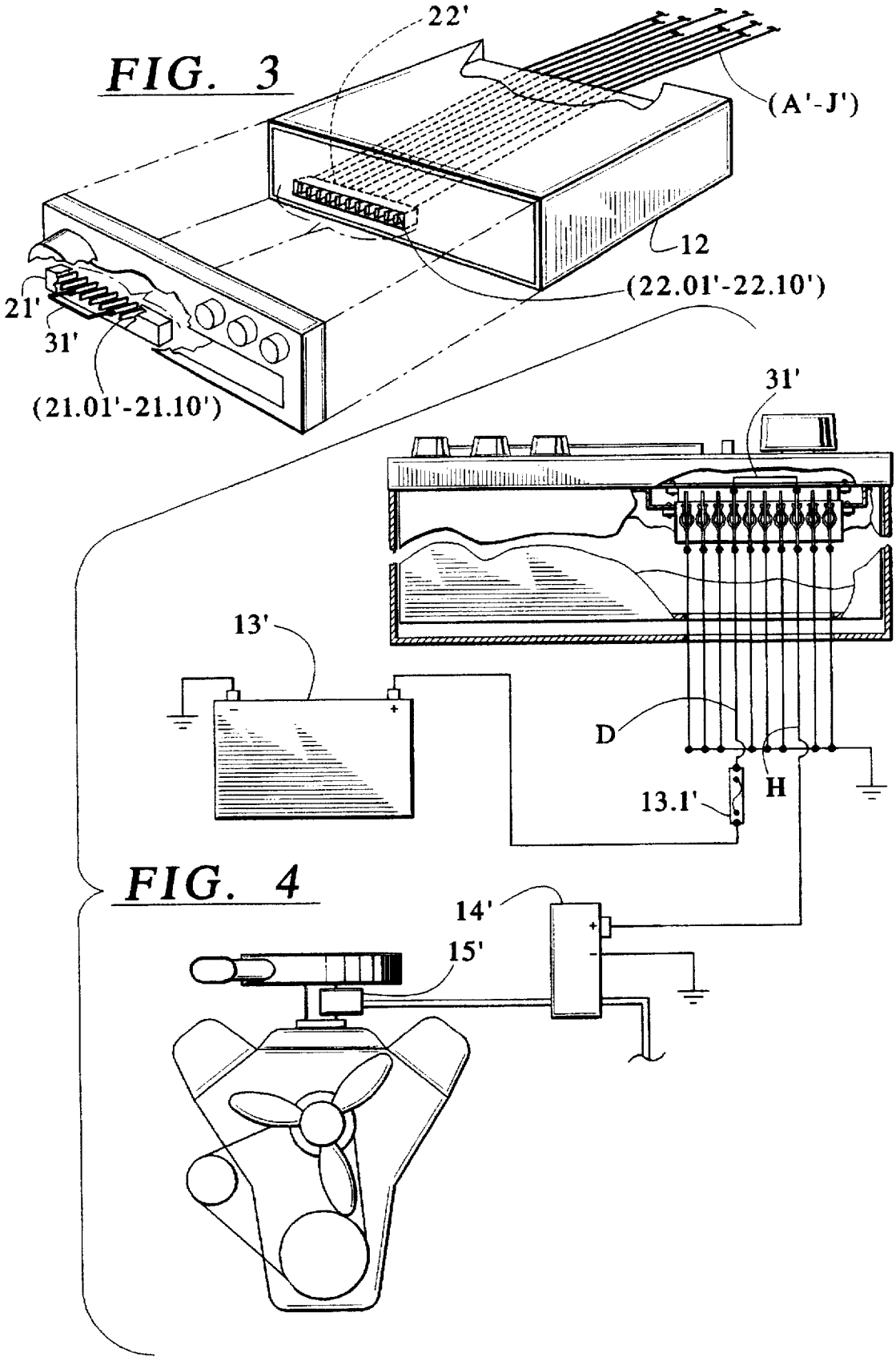
FIG. 3 illustrates an alternative arrangement for the present invention, wherein only the front panel or a portion of the front panel can be removed easily from the chassis box enclosing a car stereo, the chassis box being fixably attached inside the passenger compartment of the car within a secure bracket mounting. In contradistinction to the arrangement shown in FIG. 1 and in FIG. 2 wherein the connector assembly is located on the backplane of the removable component in FIG. 3, the connector assembly is located towards the front of the car stereo component unit, on the front side of the chassis box.
FIG. 4 is a combined illustration and circuit schematic of the arrangement shown in FIG. 3, depicting the car stereo and removable front panel in close proximity so that the two parts of the connector unit are conjoined, again with a schematic representation of wires leading away from the connector assembly and towards the motor vehicle storage battery and fuel pump.

A second embodiment, and the preferred form of the present invention, is depicted in FIG. 3 and FIG. 4 illustrating the anti-theft system of the present invention as adapted for use with the type of automotive electronic accessory unit having a detachable front control panel, or alternatively having some portion of the front control panel being detachable. This form of the invention is preferable since it allows the vehicle owner an equivalent measure of anti-theft protection, without requiring the removal of the larger and also heavier component unit that is shown in the first embodiment.

The basic elements of the preferred system are similar in most respects to the first embodiment. The differences are important to note, however. For example, in FIG. 3, the insertion portion of the connector assembly (21') is no longer located on the backplane of the removable component unit, but instead is contained within a much smaller space along the interior side of the removable control panel (11'). The receptacle portion of the assembly (22') is now located on the front surface of the electronic component unit, where it can align with and connect directly to the insertion portion of the connector assembly (21'). The cutaway perspective view shown in FIG. 3 is a pictorial representation of a knife-and-catch type connector assembly, which is one type of connector assembly arrangement that could be used.

FIG. 4 shows the schematic and pictorial diagram for the system, comparable in this illustration to the embodiment shown in FIG. 2 with the main difference again being that when the two parts of the connector assembly are conjoined during normal operation, the connector assembly is located towards the exterior surface of the front side of the car stereo unit. The electronic bridging link (31') is again contained within the removable portion of the car stereo system, in this case the front control panel only. Other basic aspects of the system are not otherwise remarkably dissimilar from the first embodiment. The bridging link permits electrical continuity between wire (d') and wire (h') so as to allow normal operation of the fuel pump (14') bringing gasoline to the engine carburetor (15'). The motor vehicle is thus effectively disabled from normal operation whenever the bridging link element is not in place, that is whenever the front control panel portion (11') is disconnected from the remaining portion of the car stereo (12'). The anti-tampering feature of the system is also comparable to the first embodiment, with the power supply storage battery (13') being wired in series with a circuit-breaking fuse (13.1') to that improperly attempting to "jump-wire" the car may cause a short circuit thus casing the fuse to open, again thereby preventing any normal operation of the motor vehicle.

Modifications for the invention as described could include disconnect circuits for other control components of the motor vehicle, such as the ignition switch, the starter motor, the fuel injection control circuit, or other electrically controlled parts of the car that are necessary either for starting or for running the motor vehicle in a normal manner. Furthermore, other electronic accessory component units could be adapted to the system, and not just the car stereo. Additionally, the specific location of the connector assembly could be enlarged or reduced as circumstances might require, while remaining within the scope and intention of the present invention. The invention as described does not exclude these or any other modifications that might become apparent to those skilled in the art, but is limited only by the scope of the claims which follow hereinbelow.

What is claimed is:

1. An anti-theft security system for a motor vehicle having a [radio receiver] *stereo system* component unit installed and securably fastened within the passenger compartment of the vehicle, the [radio receiver] component unit having furthermore an outer front panel, at least a portion thereof designed to be easily detachable from and reattachable to the remaining non-removable portion of the [radio receiver] component unit, said motor vehicle having *an electrical system including* a storage battery [with a grounded pole and a non-grounded pole,] and [having furthermore a fuel pump with a grounded pole and a non-grounded pole] *at least one control component for starting and/or operating the motor vehicle*, said anti-theft system comprising connector means for establishing an electrical connection between the detachable front panel [at least a portion thereof] and the remaining non-removable portion of the [radio receiver] *component unit*, the connector means including [a number of electrical] contact [points] *means* located on the detachable portion of the [radio receiver] *component* unit disposed to conformably align and pair together with corresponding contact [points] *means* located on the non-removable portion of the [radio receiver] *component unit*, where said [connector means furthermore includes at least one] contact [point which is] *means associated with said non-removable portion of said component unit includes means electrically* connected [electrically wired in series with the non-grounded pole of the motor vehicle fuel pump] *to the control component for starting and/or operating the motor vehicle*, and [and another contact point] *means* electrically connected [wired in series with the non-grounded pole of the motor vehicle] *to the* storage battery, whereby disjunction of the [outer] *detachable* front panel [at least a portion thereof] from the [radio receiver] component unit [also] interrupts electrical continuity between the [motor vehicle] storage battery and the [fuel pump] *control component for starting and/or operating the motor vehicle*, thereby disabling the motor vehicle from being *started and/or* operated.

2. An anti-theft security system for a motor vehicle, comprising:

i) a radio receiver component unit of the type having an outer front panel at least a portion thereof removable detachable from the remainder of the radio receiver component unit;

ii) a socket receptacle securely fastened within the non-removable portion of the radio receiver component unit, the socket receptacle containing a plurality of contact slots including a first contact slot connecting electrically to a non-grounded pole of the motor vehicle storage battery, a second contact slot connecting electrically to a non-grounded pole of the motor vehicle fuel pump, and at least one additional contact slot connected to a chassis ground on the motor vehicle;

iii) the detachable outer front panel portion additionally containing on insertable plug conformable with the socket receptacle, wherein the plug integrally contains a plurality of contact pins disposed to co-align with the receptacle, where in addition two or more of the contact pins are interconnected so that with insertion of the plug into the receptacle an electrical continuity obtains between the first and a second contact slots of the socket receptacle whereby disjunction of the outer front panel at least a portion thereof from the radio receiver component unit also interrupts electrical continuity between the motor vehicle storage battery and the fuel pump, thereby disabling the motor vehicle from being operated.

3. An anti-theft system for a motor vehicle equipped with a radio receiver component unit of which at least a portion thereof is designed to be detachably removable from a remaining portion that is non-detachable and non-removable, where the motor vehicle furthermore includes a fuel pump with a grounded pole and a non-grounded pole, and a storage battery with a grounded pole and a non-grounded pole, the anti-theft system comprising electrical connector means joining between the detachable portion and the non-detachable portion of the radio receiver component unit, said electrical connector means consisting of a receptacle socket portion and an insertable plug portion, the receptacle socket portion of the connector containing a plurality of insertion contact slots including a first contact slot electrically connected to the non-grounded pole of the motor vehicle storage battery, a second contact slot electrically connected to the non-grounded pole of the motor vehicle fuel pump, and at least one additional contact slot connected to a chassis ground of the motor vehicle, the insertable plug portion containing a plurality of contact pins arranged to co-align with the insertion contact slots of the receptacle socket, the insertion plug furthermore integrally containing an interconnection between contact pins whereby an electrical circuit continuity is established running from the non-grounded pole of the storage battery to the non-grounded pole of the motor vehicle fuel pump when the insertable portion of the connector and the receptacle portion are conjoined, and whereby electrical circuit continuity is interrupted between the non-grounded pole of the storage battery and the non-grounded pole of the motor vehicle fuel pump when the insertable portion and the receptacle portion of the connector are disjoined, thereby disabling the motor vehicle from being operated.

4. An anti-theft security system for a motor vehicle as in [any one of claims 1,] *claim* 3, including furthermore an electrical circuit connecting between the storage battery and the motor vehicle fuel pump, establishing electrical continuity between at least one contact on the connector and the ignition switch, starter motor, fuel injection controller, or other component part or sub-assembly of the motor vehicle for which an electrical connection with the storage battery is required for operation of the motor vehicle.

5. An anti-theft security system for a motor vehicle as in [any one of claims 1, 2 or] *claim* 3, where at least one of the contacts is connected to a chassis ground, and where furthermore a circuit-breaking fuse is interposed between the motor vehicle storage battery and the contact that connects with the non-grounded pole of the motor vehicle fuel pump.

* * * * *